United States Patent [19]
Norris

[11] Patent Number: 5,493,159
[45] Date of Patent: Feb. 20, 1996

[54] FLEX CIRCUIT FOR ELECTRIC MOTOR

[75] Inventor: Russell H. Norris, Portland, Oreg.

[73] Assignee: Synektron Corporation, Portland, Oreg.

[21] Appl. No.: 277,203

[22] Filed: Jul. 19, 1994

[51] Int. Cl.⁶ ................................................. H02K 11/00
[52] U.S. Cl. .................................................... 310/71
[58] Field of Search .................................. 310/71, 72, 42, 310/68 R, 218, 254, DIG. 6, 67 R; 174/117 A

[56] References Cited

U.S. PATENT DOCUMENTS

| | | | |
|---|---|---|---|
| 4,476,404 | 10/1984 | Bygdnes | 310/71 X |
| 5,023,498 | 6/1991 | Abe | 310/71 |
| 5,138,209 | 8/1992 | Chuta et al. | 310/67 R |
| 5,256,922 | 10/1993 | Tanaka et al. | 310/71 |
| 5,313,128 | 5/1994 | Robinson et al. | 310/71 |

*Primary Examiner*—Mark O. Budd
*Attorney, Agent, or Firm*—Chernoff, Vilhauer, McClung & Stenzel

[57] ABSTRACT

A connector for use in an electric motor includes a one piece flex circuit for connecting the stator coils of a motor to a set of terminals outside the motor. The circuit includes an elongate thin narrow and flexible lead portion supporting a set of parallel circuit runs where each of the circuit runs terminates in a solder pad. The solder pads are located adjacent one another at a tip of the flex circuit and the tip is affixed atop one of the stator core teeth. A land portion at the opposite end of the flex circuit includes arms supporting contact terminals arranged radially around the base of the motor.

7 Claims, 4 Drawing Sheets

FLEX CIRCUIT FOR ELECTRIC MOTOR

BACKGROUND OF THE PRESENT INVENTION

The following invention relates to a flex circuit for coupling the drive electronics, located outside of an electric motor, to the stator coils of an electric motor, and in particular relates to a one piece flex circuit for accomplishing this objective.

Disk drive spindle motors are motors that are driven by energizing the stator coils of the motor with electric currents that are supplied to the coils from electronic drivers outboard of the motor. One problem in the design of such devices is that of providing a connection for coupling the drive electronics to the stator coils to supply the currents necessary to drive the motors. This is essentially a fabrication problem where the object is to provide this connection in a way that reduces the number of process steps needed to manufacture the motor. These connections, which are usually made by running wires through the motor and by soldering those wires to the stator coils, are labor intensive and frequently prone to failure.

In the past motors have employed flex circuits as transmission media for coupling outboard electronic drivers to the coils of a motor. One such scheme is shown in Tanaka et al. U.S. Pat. No. 5,256,922. Tanaka employs a flex circuit consisting of a flexible PC film bearing circuit runs which is threaded through the motor and includes a land portion and a lead portion. The land portion which extends through an opening in the housing to the outside (referred to in Tanaka et al. as the lead portion) is a thin, flat, belt-like strip which carries connectors from the region adjacent the stator coils to a location outside of the motor. The lead portion (referred to in Tanaka et al. as the land portion) includes a plurality of arms or the like encircling the spindle in which each arm provides a number of spaced-apart solder points for connection to wires leading to the stator coils. The land portion (Tanaka's lead portion) extends generally along the coils through a slot in the base of the motor to some point outside the motor. The problem with this design is the difficulty of soldering wires from the coils to the lead portions (Tanaka's land portions) of the flex circuit at spaced locations around the spindle. The lead portions (Tanaka's land portions) must be wrapped around the spindle which is difficult to automate. In addition, the arms of the lead portion (Tanaka's land portion) give the circuit a shape which cannot easily be threaded through the motor.

Another type of prior art flex circuit is illustrated in FIGS. 1 and 1A. This design is manufactured by Seagate Technology. It overcomes the problem of the arm members of the aforementioned U.S. Pat. No. 5,256,922 by concentrating the solder leads adjacent one another on a narrow lead strip of PC material. As shown in FIG. 1 a piece of base flex material 1 includes bond pads 2 which are connected to solder leads 3. The base flex portion of FIG. 1, however, must be connected to the shaft flex portion 4 as shown in FIG. 1A. The shaft flex portion 4 includes solder points 5 which are intended to be connected to solder pads 3 on the base flex material 1. In this design the solder winding leads are all located adjacent one another at the end of the flex circuit 4 so that the operation of soldering the stator coils to the winding leads on the flex circuit 4 is simplified. The problem with the construction of FIGS. 1 and 1A is that an additional soldering operation must be performed. The pads 5 on the shaft flex circuit must be soldered to the pads 3 on the base flex circuit. This is an additional manufacturing step which requires the use of solder points which are prone to breakage.

SUMMARY OF THE PRESENT INVENTION

The present invention provides an improvement for flex circuit connectors in an electric motor. The motor comprises a plurality of metallic stator core teeth, each tooth wound with a stator coil and a hollow shaft supporting bearings coupled to a rotatable hub. A one piece flex circuit is used for connecting the stator coils to a set of terminals outside the motor. The circuit includes an elongate, thin narrow flexible lead portion supporting a set of parallel circuit runs, each of the circuit runs terminating on a solder pad. The solder pads are located adjacent one another at a tip of the elongate narrow flexible lead and the tip is in turn affixed to one of the stator core teeth atop its winding. The lead portion extends from the stator core through a slot milled in the outside of the shaft parallel to its axis to the base of the motor. A terminal portion of the flex circuit includes a set of contact pads, one for each of the circuit runs, respectively, affixed to the base of the motor. The drive electronics may then be connected to the terminals at the base of the motor in a conventional way. Wire leads from the stator cores are brought to the tip of the flexible lead portion and soldered to the solder pads. The tip may be affixed to the stator core by adhesive or the like to hold it in place.

According to this design, a one piece flex circuit is used to bring the drive circuit signals from outside the motor into the stator coils in an economical and efficient manner. A one piece flex circuit with the thin elongate narrow lead portion permits the use of a milled slot in the shaft to provide a simple and direct pathway for extending the lead portion into the motor to its location atop one of the stator windings.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
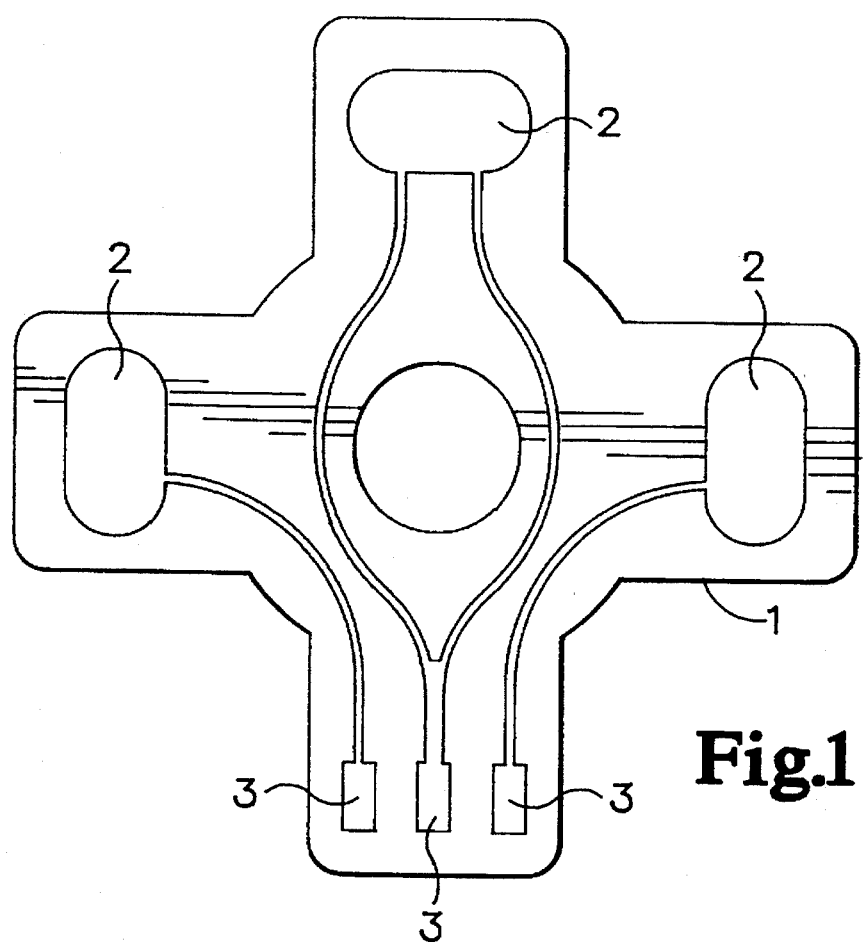
FIGS. 1 and 1A are top views respectively of a prior art flex circuit construction.
Figure 1A:
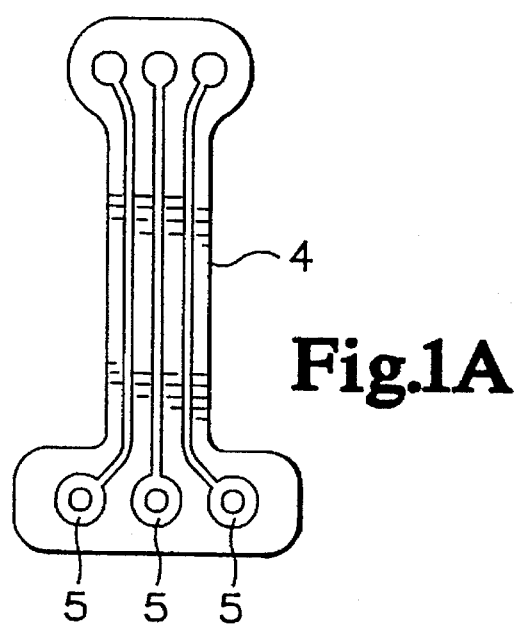
Figure 2:
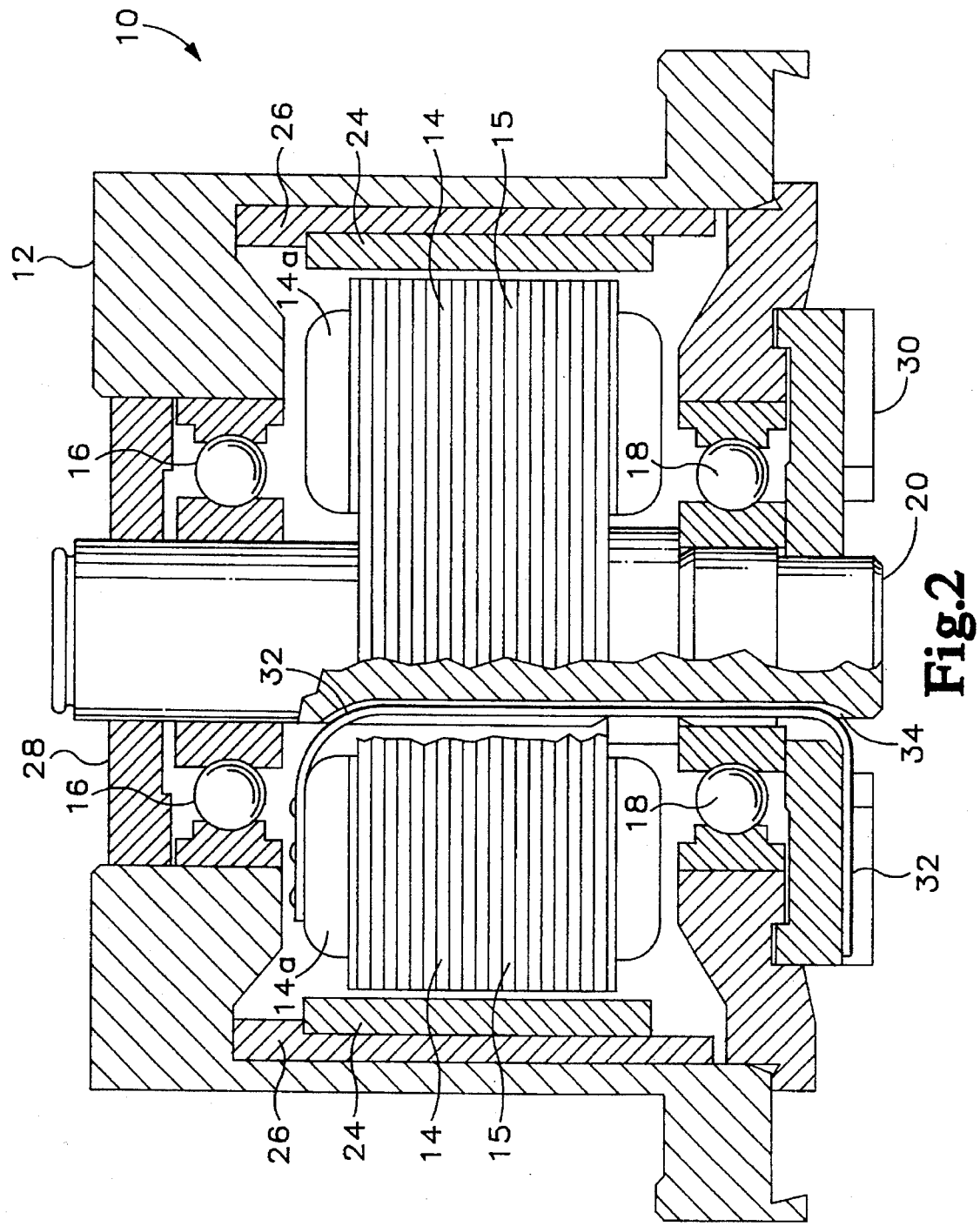
FIG. 2 is a side cutaway view of an electric motor employing the flex circuit of the present invention.

Referring to FIG. 2 an electric motor 10 includes a rotary hub 12 and wound stators 14 which each include a tooth 15 wrapped with a coil 14a. The rotary hub 12 is supported by upper bearings 16 and lower bearings 18. A hollow shaft 20 is coupled to the bearings 16 and 18 along their inner races. The hub 12 includes a single multiple pole ring magnet 24 which is held within a magnet sleeve 26. In actual operation the hub 12 and the associated magnet 24 rotates about the shaft 20 supported by the bearings 16 and 18. The shaft 20 includes an annular end cap 28 and an annular base portion 30.

A one piece flex circuit 32 extends from underneath the base portion 30 through a slot or groove 34 milled into the shaft 20 in a direction generally parallel to its axis along the inside of a wound stator 14. The flex circuit 32 emerges from the slot 34 adjacent the coil 14a of one of the stator teeth 15. The end tip 40 (refer to FIG. 3) of the flex circuit 32 is affixed to the top of a stator coil 14a by adhesive or the like. The tip portion 40 includes three soldering points 42 which are available for connection to the stator coils 15 by wires or the like (not shown).

Figure 3:
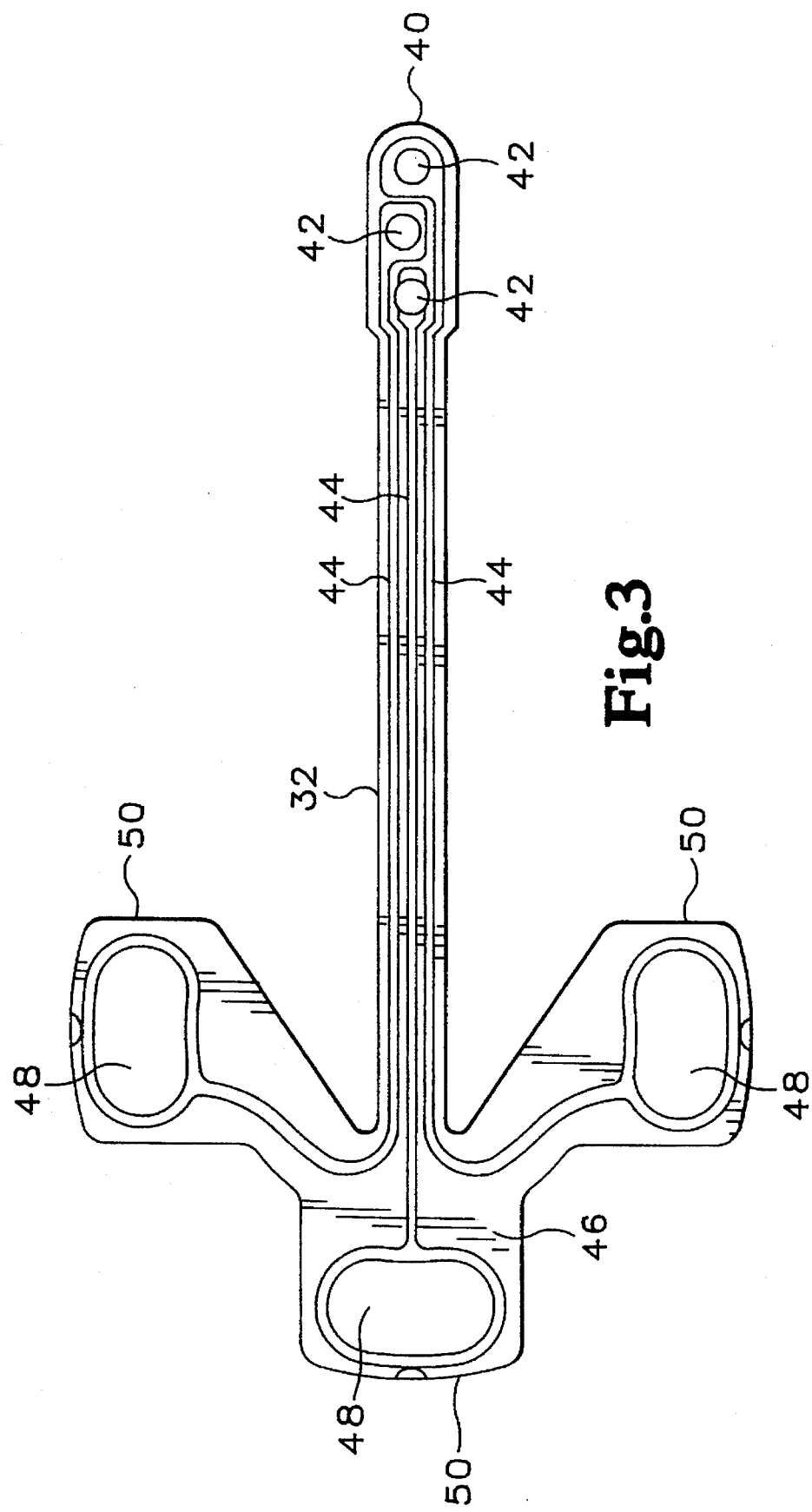
FIG. 3 is a top view of the flex circuit shown in FIG. 2.

Referring to FIG. 3 the flex circuit 32 includes circuit runs 44 which are imprinted on a thin elongate narrow strip of PC material. At the end of the flex circuit opposite from the tip portion 40 is a land portion 46 which includes three large contact pads 48 situated at the ends of generally radial arms 50 which reside in wells 49 milled into the base portion 30 which generally surround the shaft 20. The contact pads 48 are available for connection to the motor drive electronics (not shown) by any conventional means such as press fitting terminals into the wells 49.

Figure 4:
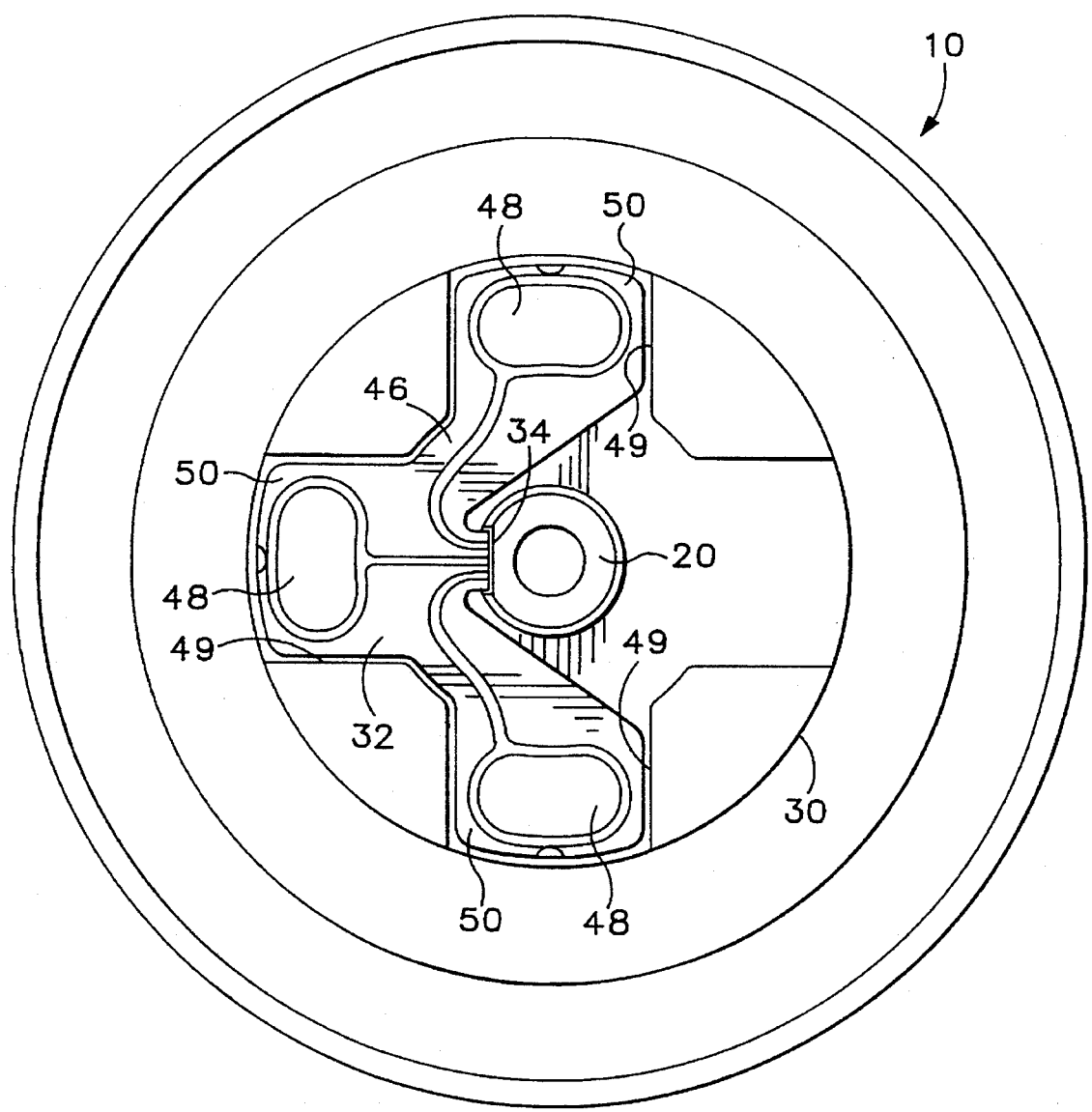
FIG. 4 is a bottom view of the flex circuit shown in FIG. 3 inserted into the motor construction of FIG. 2.

As shown particularly in FIG. 4, the solder pads 48 are arranged with the contact pads facing downward in the wells 49 in the base portion 30. It is a relatively simple task to thread the lead portion of the flex circuit 32 through the milled slot 34 along the inside the wound stator 14 in order to position the tip 40 so that it may be affixed to the top of one of the coils 14a. This is a significant simplification of the motor fabrication process and provides a strong one-piece link between the motor's stator coils and the drive electronics.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an electric motor comprising a stator core having a plurality of metallic stator core teeth, each tooth wound with a stator coil, a rotary hub generally surrounding the stator teeth and coupled by bearings to a shaft, said shaft affixed to a motor base, the improvement comprising a one piece flex circuit threaded through the motor and connecting the stator coils to a set of contact pads, said circuit including:

(a) an elongate thin, narrow, flexible lead portion of PC material supporting a set of parallel circuit runs;

(b) each of the circuit runs terminating in a solder pad wherein the solder pads are located adjacent one another at a narrow tip of the lead portion, the solder pads being linearly aligned parallel to the flexible lead portion in the tip of the lead portion, wherein said tip is affixed atop one of said stator core teeth; and (c) a land portion including said contact pads affixed to said motor base.

2. The improvement of claim 1 wherein the lead portion of said one piece flex circuit extends from said motor-base through a slot in said shaft in a direction generally parallel to an axis thereof and between the stator core and said shaft to the top of one of said teeth.

3. The improvement of claim 2 wherein said land portion includes a set of radial arms, each arm bearing one of said contact pads and generally arranged radially around said shaft in wells in said motor base.

4. The improvement of claim 1 wherein said flex circuit is continuous and unbroken.

5. The improvement of claim 1 wherein said flex circuit is essentially straight.

6. In an electric motor comprising a stator core having a plurality of metallic stator core teeth, each tooth wound with a stator coil, a rotary hub generally surrounding the stator teeth and coupled by bearings to a shaft, said shaft affixed to a motor base, the improvement comprising a one piece flex circuit connecting the stator coils to a set of contact pads, said circuit comprising:

(a) an elongate thin, narrow, flexible lead portion of PC material supporting a plurality of parallel circuit runs;

(b) a land portion including said contact pads affixed to said motor base, the land portion extending outside the motor;

(c) each circuit run of the plurality of circuit runs terminating in a solder pad, the solder pads being adjacent one another at a narrow tip of the flexible lead portion, the solder pads being linearly aligned parallel to the flexible lead portion; and (d) said tip being affixed atop one of said stator core teeth.

7. In an electric motor comprising a stator core having a plurality of metallic stator core teeth, each tooth wound with a stator coil, a rotary hub generally surrounding the stator teeth and coupled by bearings to a shaft, said shaft affixed to a motor base, the improvement comprising a continuous and unbroken piece of flex circuit connecting the stator coils to a set of contact pads, said circuit comprising:

(a) an elongate thin, narrow, flexible lead portion of PC material supporting a plurality of parallel circuit runs;

(b) a land portion including said contact pads affixed to said motor base;

(c) each circuit run of the plurality of circuit runs terminating in a solder pad, the solder pads being adjacent one another at a narrow tip of the flexible lead portion, the solder pads being linearly aligned parallel to flexible lead portion; and (d) said tip being affixed atop one of said stator core teeth.

* * * * *